US008880441B1

(12) United States Patent
Chen et al.

(10) Patent No.: US 8,880,441 B1
(45) Date of Patent: Nov. 4, 2014

(54) CLICK STREAM ANALYSIS FOR FRAUD DETECTION

(75) Inventors: Jidong Chen, Beijing (CN); Derek Lin, San Mateo, CA (US); Alon Kaufman, Bnei-Dror (IL); Yael Villa, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 237 days.

(21) Appl. No.: 13/433,633

(22) Filed: Mar. 29, 2012

(51) Int. Cl.
*G06F 15/18* (2006.01)
(52) U.S. Cl.
CPC ..................................... *G06F 15/18* (2013.01)
USPC ............................................................ 706/12
(58) Field of Classification Search
CPC .............................. G06F 15/18; G06N 99/005
See application file for complete search history.

(56) References Cited

U.S. PATENT DOCUMENTS

2009/0241174 A1* 9/2009 Rajan et al. ........................ 726/5

OTHER PUBLICATIONS

Ding, H. et al. "Querying and mining of time series data: experimental comparison of representations and distance measures." Proceedings of the VLDB Endowment 1.2 (2008): 1542-1552.*

Eusebi, C. et al. "A Data Mining Study of Mouse Movement, Stylometry, and Keystroke Biometric Data." Proc. CSIS Research Day, Pace Univ (2008).*
Pusara, M. et al. "User re-authentication via mouse movements." Proceedings of the 2004 ACM workshop on Visualization and data mining for computer security. ACM, 2004.*
Clauset et al., "Finding Community Structure in Very Large Networks," Phys. Rev. E70, 066111 (2004).
Ding et al., "Querying and Mining of Time Series Data: Experimental Comparison of Representations and Distance Measures," VLDB 2008.

* cited by examiner

*Primary Examiner* — Kakali Chaki
*Assistant Examiner* — Eric Nilsson
(74) *Attorney, Agent, or Firm* — BainwoodHuang (57) ABSTRACT

An improved technique trains a fraud detection system to use mouse movement data as part of a user profile. Along these lines, a training apparatus receives sets of mouse movement datasets generated by a legitimate user and/or a fraudulent user. The training apparatus assigns each mouse movement dataset to a cluster according to one of several combinations of representations, distance metrics, and cluster metrics. By correlating the clusters with the origins of the mouse movement datasets (legitimate or fraudulent user), the training apparatus constructs a robust framework for detecting fraud at least partially based on mouse movement data.

18 Claims, 7 Drawing Sheets

| Representation | Distance Metric | Dimensionality | Threshold | Pass-rate | Distance-pass rate |
|---|---|---|---|---|---|
| N/A | DTW | N/A | N/A | 0.78 | 0.95 |
| N/A | DTW | N/A | 60 | 0.78 | 0.94 |
| PAA | Eucl. | 60 | 60 | 0.82 | 0.89 |
| PAA | Eucl. | 40 | 60 | 0.82 | 0.89 |
| PAA | DTW | 60 | 60 | 0.8 | 0.94 |
| DFT | Eucl. | 60 | 60 | 0.82 | 0.9 |
| DFT | Eucl. | 40 | 60 | 0.82 | 0.9 |
| DFT | DTW | 60 | 60 | 0.71 | 0.89 |

72    74    76    78    80    82

90

| Representation | Distance Metric | Cluster Metric | Pass-rate | Distance-pass rate |
|---|---|---|---|---|
| DFT | Eucl. | X-means | 0.81 | 0.89 |
| DFT | Eucl. | Newman | 0.9 | 0.95 |

Receiving a set of mouse movement datasets, each mouse movement dataset of the set of mouse movement datasets including mouse movement data generated by either a legitimate user or a fraudulent user
152

Collecting the set of mouse movement datasets within a database stored on a storage device of the fraud detection system
154

Performing a teaching operation on a risk engine of the fraud detection system using the database to train the risk engine to differentiate between mouse movement data generated by the authentic user and mouse movement data generated by the fraudulent user
156

Figure 7

CLICK STREAM ANALYSIS FOR FRAUD DETECTION

BACKGROUND

Some service providers use fraud detection systems to distinguish between legitimate and fraudulent transactions. For example, an online bank may employ a risk score engine of a fraud detection system to assign risk scores to banking transactions where higher risk scores indicate a higher risk of fraud.

In generating a risk score, the risk score engine takes input values of various transaction attributes (e.g., time of receipt, IP address, geolocation) of a current transaction. In the above-mentioned example, for each customer of the online bank, there is an associated profile based on values of the attributes associated with previous transactions involving that customer. The risk score generated by the risk score engine also depends on the profile associated with the customer. Significant variation of one or more attribute values in the current transaction from those in the customer's profile may cause the risk score engine to generate a high risk score indicative of the banking transaction having a high risk of being fraudulent.

Some fraud detection systems undergo "training." Such fraud detection systems use empirical models based on simulated, or training, customer profile and transaction data to predict the variations in customer profiles that determine the risk of a transaction being fraudulent. A conventional system for training fraud detection systems builds such models around transaction attributes such as those described above. The conventional system generates the models from statistical analyses of these transaction attributes for a set of customers.

SUMMARY

Unfortunately, there are deficiencies with the above-described conventional systems for training fraud detection systems. For example, sophisticated man-in-the-browser (MITB) attacks stemming from malware resident on a customer's computer can foil fraud detection schemes trained by the above-described conventional systems. Along these lines, such attacks, via the malware, mimic the customer's profile when submitting a fraudulent transaction in that customer's name. Such malware gathers information about typical times the customer submits transaction requests, from what IP address, typical transaction amounts, etc. By gathering the information over a sufficiently long time, the malware can accurately construct the customer's profile.

In contrast to conventional systems for training fraud detection systems that rely on transaction attributes that can be easily mimicked, an improved technique trains a fraud detection system to use mouse movement data as part of a user profile. Along these lines, a training apparatus receives sets of mouse movement datasets generated by a legitimate user and/or a fraudulent user. The training apparatus assigns each mouse movement dataset to a cluster according to one of several combinations of representations, distance metrics, and cluster metrics. By correlating the clusters with the origins of the mouse movement datasets (legitimate or fraudulent user), the training apparatus constructs a robust framework for detecting fraud at least partially based on mouse movement data.

Advantageously, the improved technique allows for more reliable fraud detection for electronic transactions, despite sophisticated MITB attacks, because mouse movement patterns are very difficult to mimic. For example, the very nature of human motion makes it highly unlikely that MITB malware can simulate mouse movements with any significant accuracy. Moreover, only the most sophisticated fraudulent human user, working for months, even years, under extremely strenuous physical conditions, would be able to copy the mouse movements of a legitimate customer to such a degree of accuracy that the training apparatus would not be able to tell the fraudulent user from the legitimate customer.

One embodiment of the improved technique is directed to a method of training a fraud detection system to distinguish between legitimate users and fraudulent users. The method includes receiving a set of mouse movement datasets, each mouse movement dataset of the set of mouse movement datasets including mouse movement data generated by either a legitimate user or a fraudulent user. The method also includes collecting the set of mouse movement datasets within a database stored on a storage device of the fraud detection system. The method further includes performing a teaching operation on a risk engine of the fraud detection system using the database to train the risk engine to differentiate between mouse movement data generated by the authentic user and mouse movement data generated by the fraudulent user.

Additionally, some embodiments of the improved technique are directed to a system configured to train fraud detection systems. The system includes a network interface, memory, and a controller, the controller being configured to carry out the method of training the fraud detection system to distinguish between legitimate users and fraudulent users.

Furthermore, some embodiments of the improved technique are directed to a computer program product having a non-transitory computer readable storage medium which stores code including a set of instructions to carry the method of.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique trains a fraud detection system to use mouse movement data as part of a user profile. Along these lines, a training apparatus receives sets of mouse movement datasets generated by a legitimate user and/or a fraudulent user. The training apparatus assigns each mouse movement dataset to a cluster according to one of several combinations of representations, distance metrics, and cluster metrics. By correlating the clusters with the origins of the mouse movement datasets (legitimate or fraudulent user), the training apparatus constructs a robust framework for detecting fraud at least partially based on mouse movement data.

Advantageously, the improved technique allows for more reliable fraud detection for electronic transactions, despite sophisticated MITB attacks, because mouse movement patterns are very difficult to mimic. For example, the very nature of human motion makes it highly unlikely that MITB malware can simulate mouse movements with any significant accuracy. Moreover, only the most sophisticated fraudulent human user, working for months, even years, under extremely strenuous physical conditions, would be able to copy the mouse movements of a legitimate customer to such a degree of accuracy that the training apparatus would not be able to tell the fraudulent user from the legitimate customer.

Figure 1:
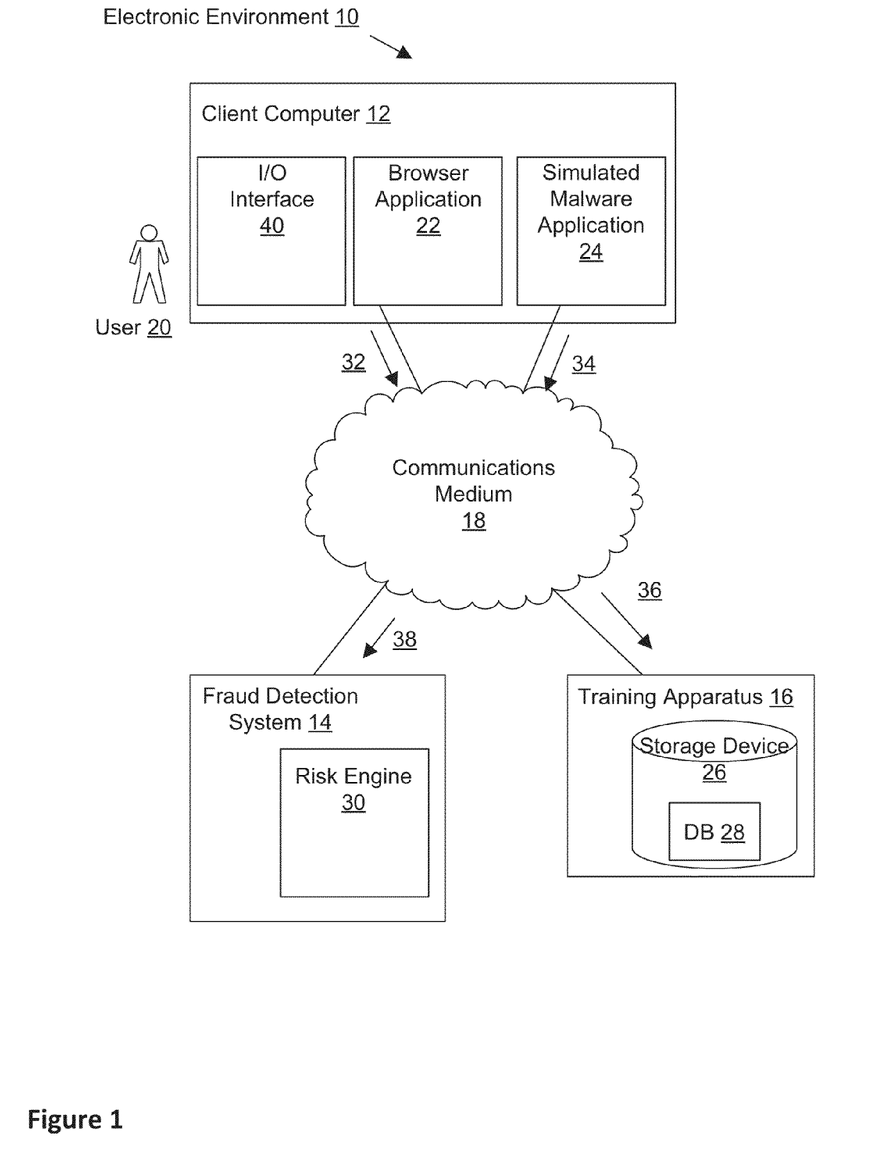
FIG. 1 is a block diagram illustrating electronic environment for carrying out the improved technique.

FIG. 1 illustrates an electronic environment 10 for carrying out the improved technique. Electronic environment 10 includes client computer 12, fraud detection system 14, training apparatus 16, and communications medium 18.

Communication medium 18 provides network connections between client computer 12, fraud detection system 14, and training apparatus 16. Communications medium 18 may implement a variety of protocols such as TCP/IP, UDP, ATM, Ethernet, Fibre Channel, combinations thereof, and the like. Furthermore, communications media 18 may include various components (e.g., cables, switches/routers, gateways/bridges, NAS/SAN appliances/nodes, interfaces, etc.). Moreover, the communications medium 18 are capable of having a variety of topologies (e.g., queue manager-and-spoke, ring, backbone, multi drop, point to-point, irregular, combinations thereof, and so on).

In some arrangements, client computer 12 takes the form of a personal computer; in other arrangements, client computer 12 takes one of several forms including a laptop, tablet computer, personal digital assistant, smartphone, netbook, and server. Client computer 12 includes I/O interface 40 and browser application 22, and simulated malware application 24.

I/O interface 40 includes driver applications that translate input from user 20 into instructions for client computer 12. Specifically, in some arrangements, I/O interface 40 includes a mouse driver; in other arrangements, however, I/O interface 40 includes other drivers including those for a tactile interface (e.g., a touch screen), a trackball, a light pen and a keyboard.

Browser application 22 is software configured to render a browser window to user 20 on computer 22 for viewing websites of service providers and inputting and submitting transaction data. Browser application 22 is also configured to track and record mouse movement data 32 from I/O interface 40 and send mouse movement data 32 to training apparatus 16 over communications medium 18.

Simulated malware application 24 is software configured to simulate mouse movements within a browser window of browser application 22. The software is also configured to generate mouse movement data 34 based on the simulations and send mouse movement data 34 to training apparatus 16 over communications medium 18. In some arrangements, simulated malware application 24 takes the form of a javascript add-on to browser application 22.

Fraud detection system 14 is constructed and arranged to distinguish between legitimate and fraudulent transactions. In some arrangements, fraud detection system 14 takes the form of a server; in other arrangements, however, fraud detection system 14 can take other forms including a desktop or laptop computer. Fraud detection system 14 includes a risk engine 30.

Risk engine 30 is constructed and arranged to generate a risk score based on transaction data. In some arrangements, risk engine 20 includes specialized hardware such as an MPU, ASIC, or the like.

In some arrangements, training apparatus 16 takes the form of a server; in other arrangements, however, training apparatus 16 can take other forms including a desktop or laptop computer. Training apparatus 16 includes storage device 26.

In some arrangements, storage device 26 takes the form of a hard disk drive; in other arrangements, storage device 26 can take other forms including solid-state storage and RAID arrays. Storage device 26 is constructed and arranged to store database 28.

Database 28 takes the form of a relational database that can store any number of entries and field values in each entry.

During operation, one or both of user 20 and simulated malware application 24 generates, respectively, legitimate mouse movement datasets 32 and/or fraudulent mouse movement datasets 34. Each mouse movement dataset includes coordinate locations on an input area or a monitor, sampled at equal time intervals and takes the form of a time series of mouse locations. Each mouse movement dataset represents a single user session at which user 20 (or simulated malware 24) moves a cursor about a webpage for a period of time, or session length.

Client computer 12 sends the mouse movement datasets 32 and 34 to training apparatus 16 through communications medium 18; mouse movement datasets 32 and 34 combine to make up mouse movement datasets 36, which training apparatus 16 receives.

Upon receipt of mouse movement datasets 36, training apparatus 16 collects each individual dataset (corresponding to a single session) into an entry of database 28. Each entry of database 28, then, stores a number of coordinate pairs corresponding to the length of the session associated with the dataset 36.

Once training apparatus 16 collects dataset 36 into database 28, training apparatus 16 then performs a teaching operation 38 that uses the entries in database 28 to train risk engine 30 to differentiate between mouse movement data generated by a legitimate user (e.g., user 20) and mouse movement data generated by a fraudulent user (e.g., simulated malware application 24).

Further details of training apparatus 16 and of teaching operation 38 are described below with respect to FIGS. 2, 3, 4, 5, and 6.

Figure 2:
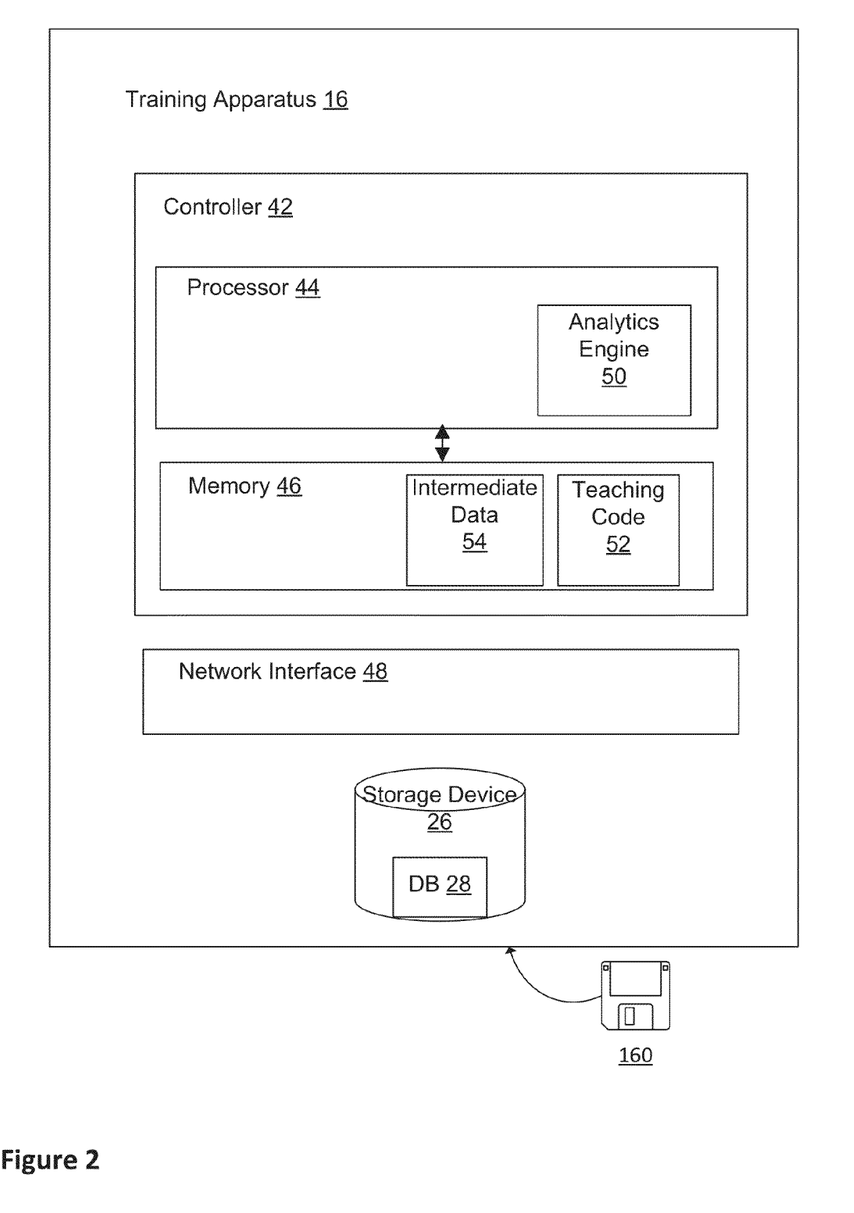
FIG. 2 is a block diagram illustrating a training apparatus within the electronic environment shown in FIG. 1.

FIG. 2 illustrates further details of training apparatus 16. Training apparatus, in addition to storage device 26, also includes network interface 48 and controller 42, which in turn includes processor 44 and memory 46.

Network interface 48 takes the form of an Ethernet card; in some arrangements, network interface 48 takes other forms including a wireless receiver and a token ring card.

Memory 46 is configured to store code which includes teaching code 52 configured to train fraud detection system 14 to distinguish between legitimate users and fraudulent users. Memory 42 is further configured to store intermediate data 54 resulting from teaching operation 38. Memory 42 generally takes the form of, e.g., random access memory, flash memory or a non-volatile memory.

Processor 44 takes the form of, but is not limited to, Intel or AMD-based MPUs, and can include a single or multi-cores each running single or multiple threads. Processor 44 is coupled to memory 46 and is configured to execute instructions from teaching code 52. Processor 44 includes analytics engine 50.

Analytics engine 50 takes the form of hardware configured to perform analysis of the mouse movement data stored in database 28 as part of teaching operation 38. In some arrangements, analytics engine 50 takes the form of a separate appliance connected to training apparatus 16, such as those made available by Greenplum, a division of EMC, Inc.

During operation, network interface 28 receives mouse movement datasets 36. Processor 44 collects datasets 36 into entries of database 28. Analytics engine 50 performs analysis on the mouse movement datasets 36 in the entries of database 36. Such analysis will be described with respect to FIGS. 3, 4, 5, and 6 below.

Figure 3:
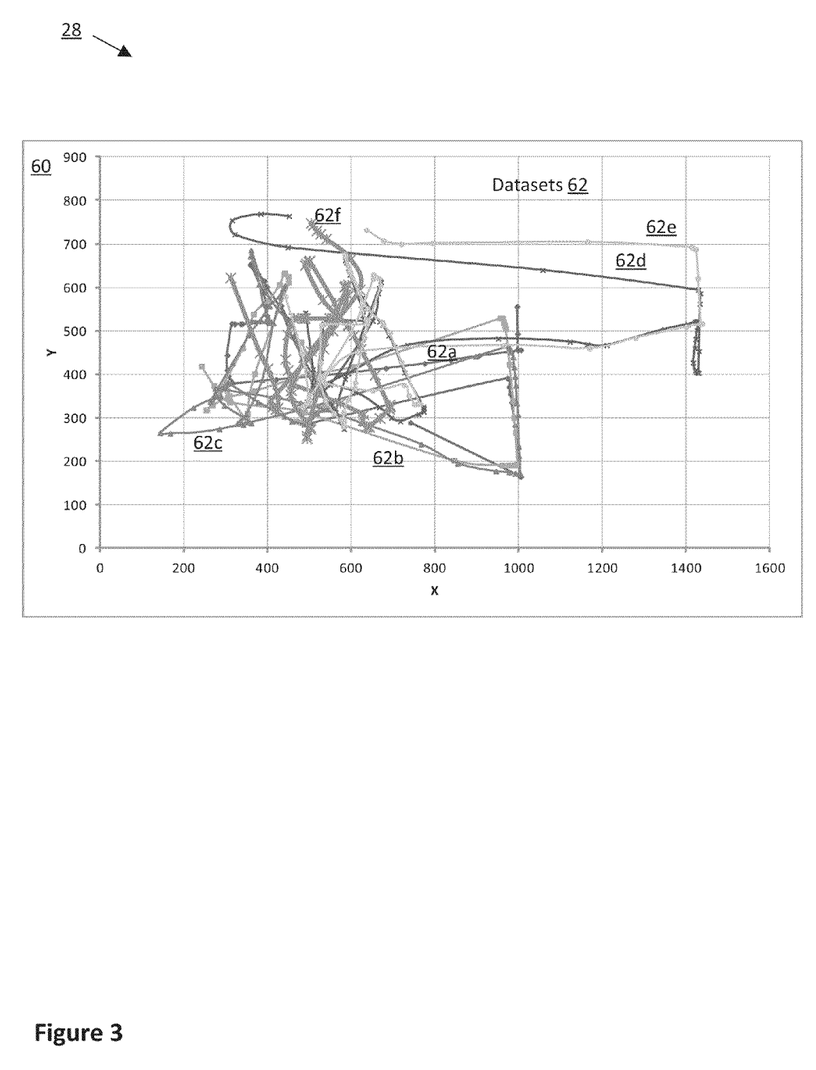
FIG. 3 is a chart representing mouse movement datasets stored in a database in the training apparatus shown in FIG. 2.

FIG. 3 illustrates a chart 60 of mouse movement datasets 62 that are stored in database 28. In this case, there are six datasets 62a, 62b, 62c, 62d, 62e, and 62f. Chart 60 shows an x-y trace of each mouse movement dataset 62.

Some of the mouse movement datasets 62 were generated by a legitimate user (e.g., user 20) and some were generated by a fraudulent user (e.g., simulated malware application 24). Analytics engine 50 (see FIG. 2) determines a representation for the datasets that reduces each dataset to a form in which certain patterns emerge that provide for meaningful comparisons between datasets. Meaningful comparisons are best made using a proper distance metric that defines distances between mouse movement datasets 62. Finally, analytics engine 50 places the datasets 62 into various clusters according to the comparisons. Details of these comparisons will be described with respect to FIG. 4.

Figure 4:
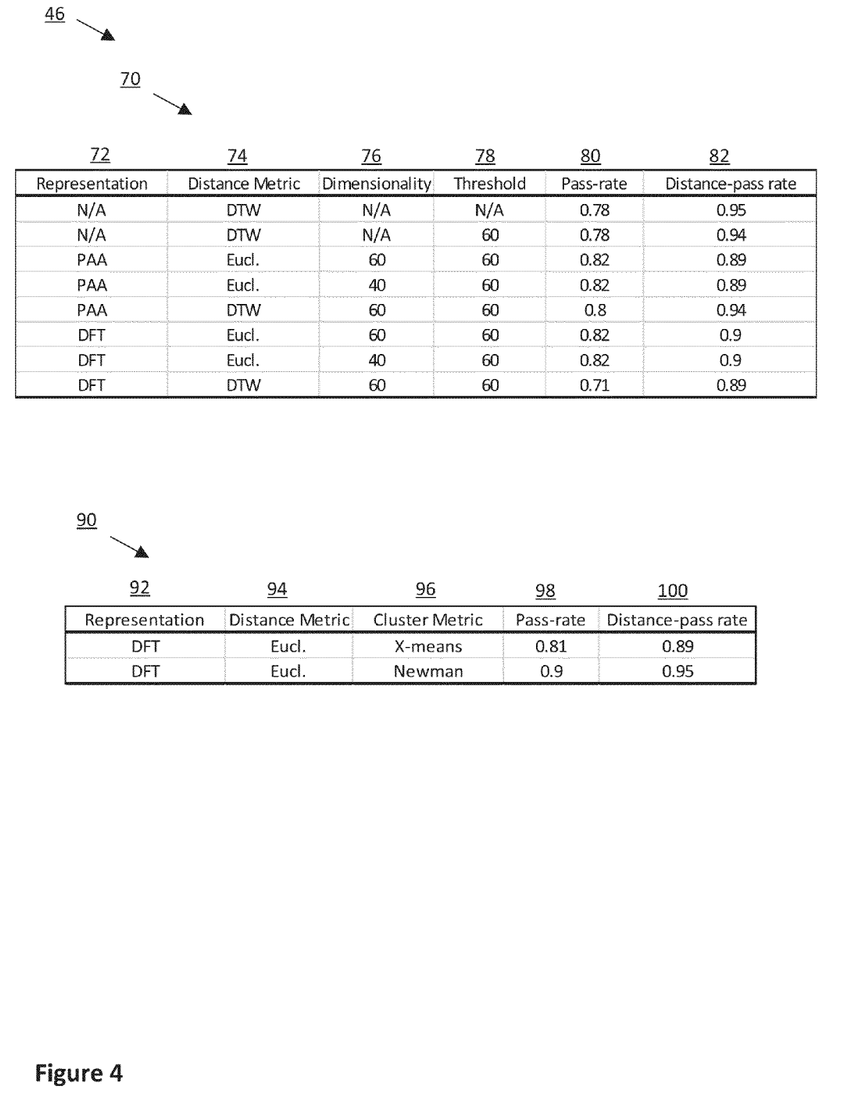
FIG. 4 is a set of charts representing alternative evaluations of the mouse movement datasets shown in FIG. 3.

FIG. 4 illustrates charts 70 and 90 representing aggregated results of comparison and clustering operations, respectively. Chart 70 is a table which includes fields representing a particular representation 72 for the datasets 62, a distance metric 74 used for defining distance between datasets 62, a dimensionality 76 of the datasets 62, a threshold dimensionality 78, a pass-rate 80 and distance-pass rate 82. Each entry of table 70 represents a combination of representation 72, distance metric 74, dimensionality 76, and threshold 78 values, as well as resulting pass-rate 80 and distance-pass rate 82 values. Chart 90 is a table which includes fields for representation 92, distance metric 94, cluster metric 96, pass-rate 98, and distance-pass rate 100. The meaning of these terms will be explained in what follows.

The merit function distance-pass rate 82 measures the likelihood that datasets that are close together were generated from the same source. In defining this merit function, the quantities "inner-distance" and "inter-distance" are defined as follows. Inner-distance of a legitimate dataset (i.e., a dataset generated by a legitimate user) of the set of legitimate datasets is defined as an average value of a distance between the legitimate dataset and other of legitimate datasets of the set of legitimate datasets. Inter-distance of a legitimate dataset is defined as an average value of the distance between the legitimate dataset and fraudulent datasets (e.g., generated by simulated malware application 24). The distance-pass rate 82 is defined as the proportion of legitimate datasets having the inter-distance being greater than the inner-distance.

Distances are defined by a distance metric 74. One distance metric is the standard Euclidean metric; other distance metrics include dynamic time warping (DTW) and MINDIST. In some arrangements, analytics engine 50 chooses a distance metric 74 for defining distance between datasets 62 based on which distance metric 74 maximizes the value of the distance-pass rate 82.

In other arrangements, analytics engine 50 chooses a representation 72 for the datasets 62 in order to find an efficient expression of patterns inherent in datasets 62. While analysis may be performed on the raw data, powerful methods exist to reduce the amount of raw data while preserving the information the raw data provides. For example, a simple sine wave may be sampled at many points over time to produce a large body of raw time series data; nevertheless, a discrete Fourier transform (DFT) may reduce this data to a single point representing the frequency of the sine wave.

The DFT is one possible representation of the time series. Other possible representations include a discrete wavelet transform (DWT), a piecewise aggregate approximation (PAA), and symbolic aggregate approximation (SAX). Results of applying a representation 72 to a dataset 62 is a transform of the dataset 62.

Distance metrics 74 are defined with respect to transforms of datasets 62. Along these lines, analytics engine 50 chooses a combination of distance metric 74 and representation 72 by based on the largest value of the distance-pass rates 82 over various combinations of representations 72 and distance metrics 74.

Based on table 70, analytics engine 50 would choose the DFT representation 72 and the Euclidean metric 74.

In some arrangements, analytics engine 50 further considers dimensionality 76 and threshold 78 as further factors for distinguishing datasets. Dimensionality 76 is defined as the number of data points kept in a particular representation 72. Threshold 78 is defined as the minimum number of data points in the raw dataset 62 that is considered by analytics engine 50 for inclusion in distance-pass rate computations.

In some arrangements, analytics engine 50 also computes a pass-rate as part of choosing a representation 72 and distance metric 74. The pass-rate 80 is defined as the proportion of legitimate datasets from which more than half of the fraudulent datasets are at a distance larger than the inter-distance. In some arrangements, analytics engine 50 chooses a combination of representation 72 and distance metric 74 based on the largest value of the product of the distance-pass rate 82 and the pass-rate 80. A benefit of incorporating the pass-rate 90 into selection of representations 72 and distance metrics 74 is that distance-pass rate 82 may be sensitive to outlying time series data.

Once analytics engine 50 chooses a representation 72 and a distance metric 74 as a basis for comparing datasets 62, analytic engine 50 is ready to assign the datasets 62 to various clusters according to a cluster metric 96, as illustrated with respect to chart 90.

In chart 90, the meanings for representation 92 and distance metric 94 are as described above, except that at the cluster selection stage, analytic engine 50 has already chosen the representation 92 and the distance metric 94; that is, the values of these fields are fixed.

Cluster metric 96 is an algorithm used to assign datasets to one cluster or another based on distances between the datasets. Examples of cluster metrics 96 include K-means, X-means, OPTICS, and Newman's algorithm.

The merit function distance-pass rate 100 is defined similarly as above, except with respect to a cluster metric 96. That is, for each mouse movement dataset 62 assigned to a first cluster, an inner-distance 100 of the mouse movement dataset is defined as an average value of the distance, as defined by the distance metric 94, between the mouse movement dataset and other mouse movement datasets assigned to the first cluster. Also, for each mouse movement dataset assigned to the first cluster, an inter-distance of the mouse movement dataset is defined as an average value of the distance, as defined by the distance metric, between the mouse movement dataset and mouse movement datasets assigned to the second cluster. The distance-pass rate 100, then, is the proportion of mouse movement datasets in the first cluster having the inter-distance being greater than the inner-distance. As above, in some arrangements, analytics engine 50 chooses the cluster metric 96 corresponding to the largest value of the distance-pass rate 100. Further, a pass-rate is defined as a proportion of mouse movement datasets assigned to the first cluster from which more than half of the mouse movement datasets assigned to a second cluster are at a distance larger than the inter-distance. In some further arrangements, analytics engine 50 chooses the cluster metric 96 corresponding to the largest value of the product of the distance-pass rate 100 and the pass-rate 98. In the case illustrated in chart 90, analytics engine 50 would choose Newman's algorithm as the cluster metric.

Figure 5:
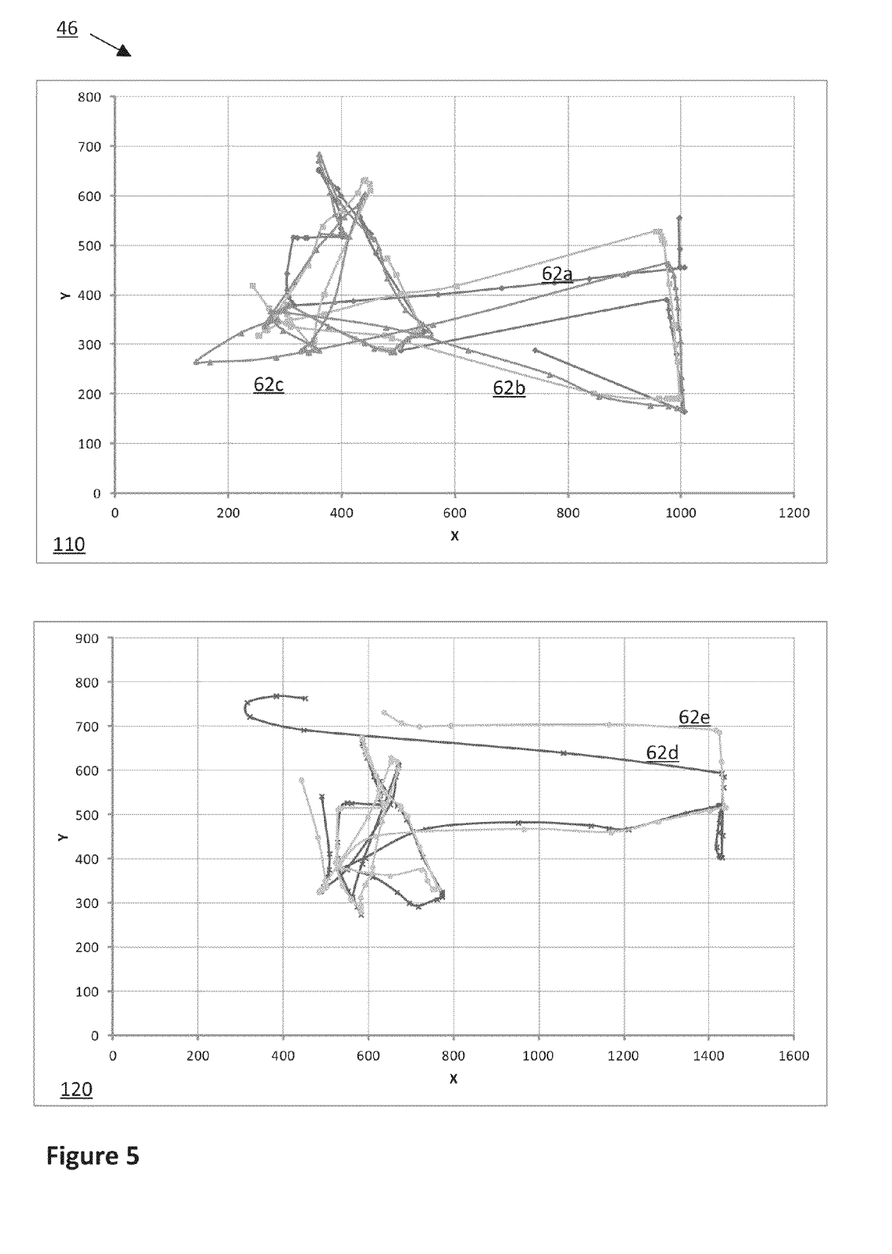
FIG. 5 is another set of charts representing the mouse movement datasets shown in FIG. 3.

FIG. 5 illustrates a result of separating the datasets 62 into two clusters according to the above description. The clusters are represented in charts 110 and 120. In chart 110, x-y traces of datasets 62a, 62b, and 62c are illustrated. In some arrangement, these datasets correspond to datasets originating from the legitimate user and the fraudulent user, respectively.

In other arrangements, the clusters correspond to datasets originating from the same user; in this case, analytics engine 50 carries out further analysis. In this case, analytics engine 50 forms, for each dataset 62, a binary value o equal to 0 or 1 depending on whether the dataset 62 originated with the legitimate user or the fraudulent user, respectively. For each dataset 62, analytics engine 50 generates an average distance d from dataset 62 to other datasets which originated from the legitimate user. Analytics engine 50 then forms a value pair <d,o> for each dataset 62 to train a logistic regression model as follows.

A session corresponding to a dataset 62 is called negative if the originator of dataset 62 during the session is legitimate and is called positive if the originator of dataset 62 during the session is fraudulent. Moreover, in classification algorithms such as the cluster algorithm described above that maps a distance d to a binary decision o, we call a positive session tp (true positive) if the classifier distinguishes it as positive, similarly defining the concepts of fp (false positive), tn (true negative) and fn (false negative). Further, define positive precision as $$\frac{tp}{tp+fp},$$

positive recall as $$\frac{tp}{tp+fn},$$

negative precision as $$\frac{tn}{tn+fn},$$

and negative recall as $$\frac{tn}{tn+fp}.$$

Analytics engine 50 maps each value pair to these quantities as a result of training the logistic regression model.

Figure 6:
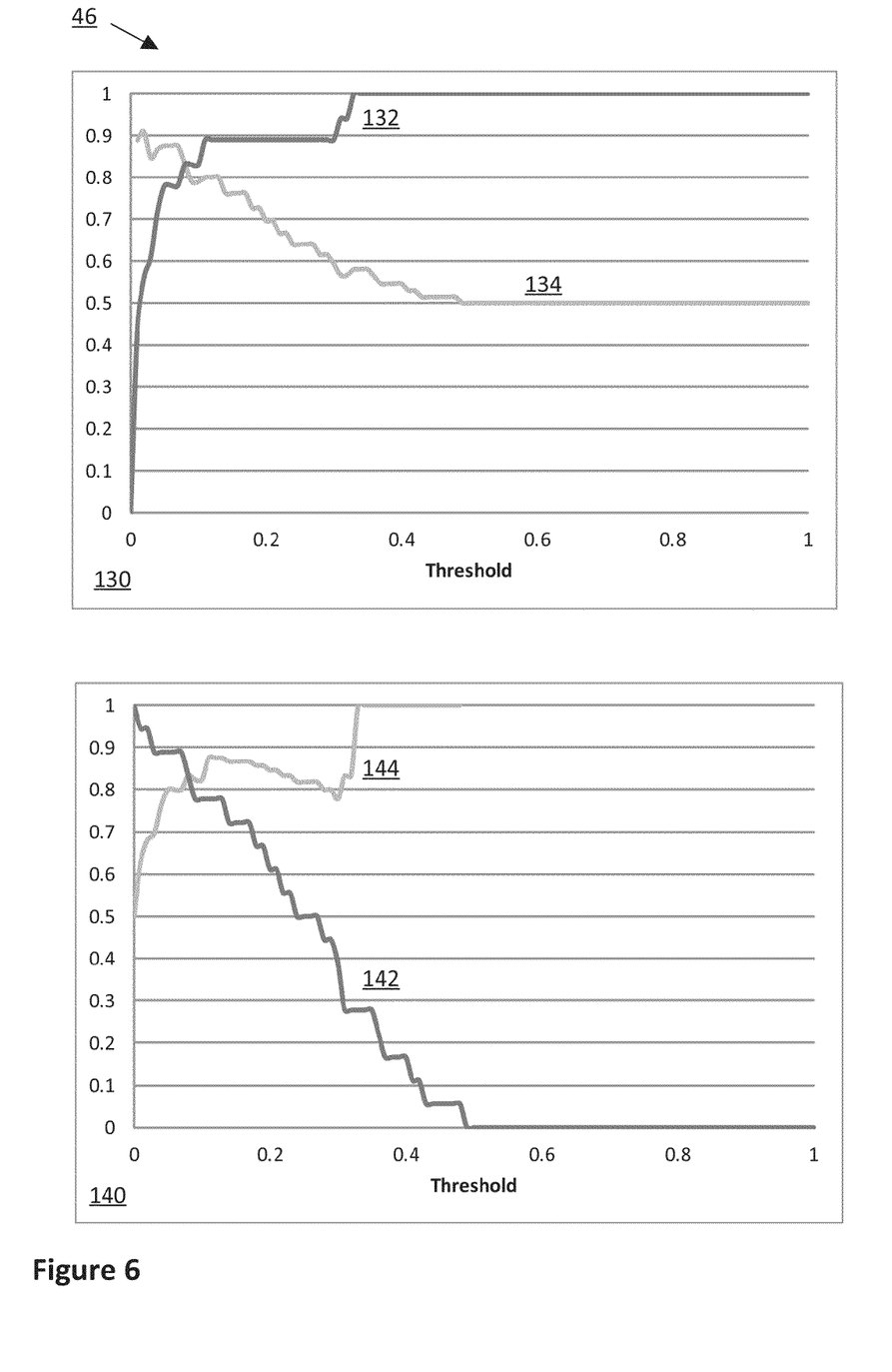
FIG. 6 is a set of charts representing results of applying logistic regressive models to the mouse movement datasets shown in FIG. 3.

FIG. 6 illustrates charts 130 and 140 which represent results of an example training of a logistic regression model for positive and negative sessions, respectively. In chart 130, positive precision 132 and positive recall 134 are plotted against a decision threshold. In chart 140, negative precision 142 and negative recall 144 are plotted against decision threshold. The plots shown here illustrate a value of the decision threshold (i.e., about 0.3) where the precision and recall values have the largest rate of change and therefore is best for the logistic regression model to use for decision making.

Analytics engine 50 collects information regarding the best representation 72, distance metric 74, and cluster metric 96, and logistic regression model according to the above description as part of the teaching operation 38, results of which processor 44 sends to risk engine 30.

Figure 7:
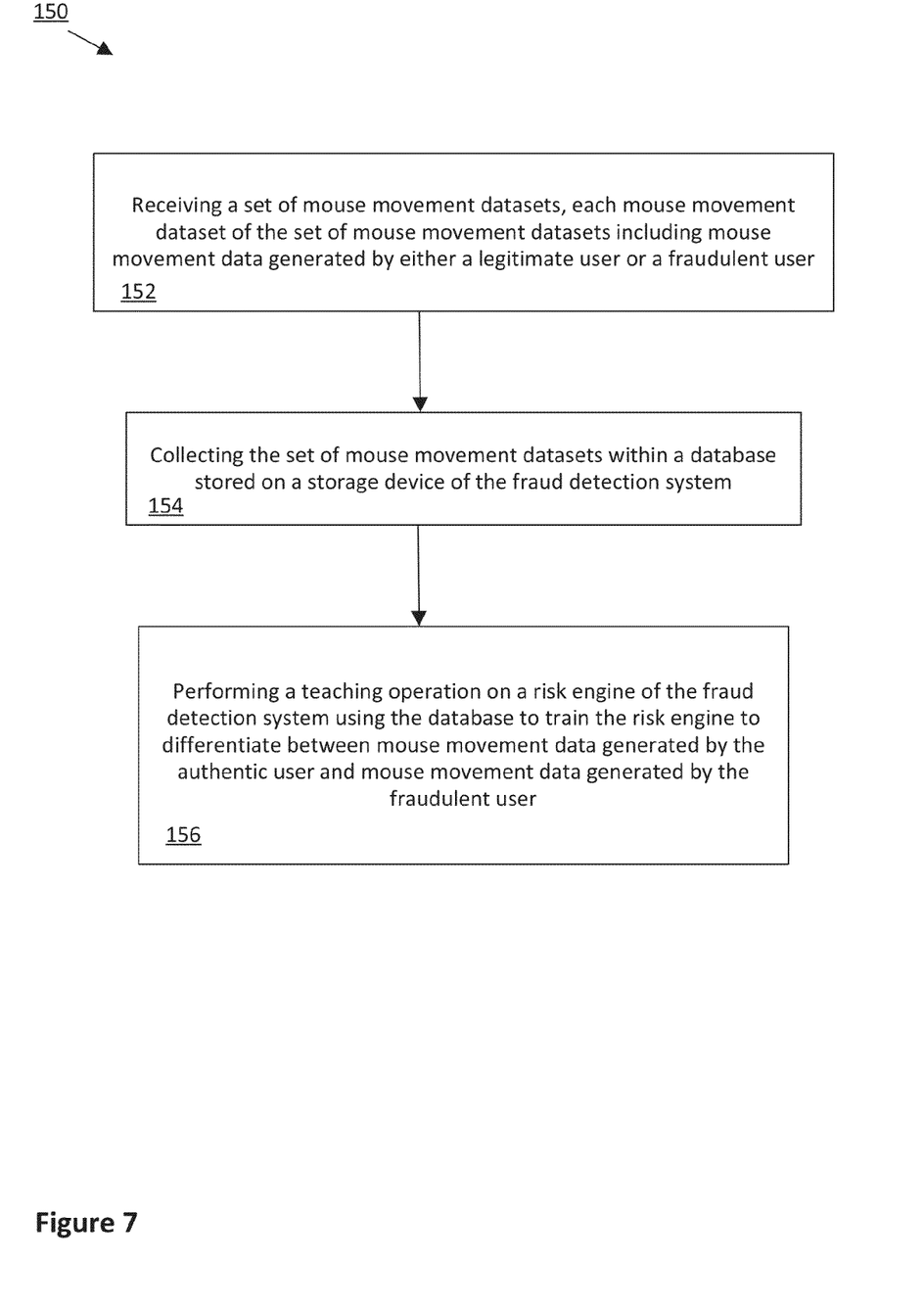
FIG. 7 is a flow chart illustrating a method of carrying out the improved technique within the electronic environment shown in FIG. 1.

FIG. 7 illustrates a method 150 of training a fraud detection system to distinguish between legitimate users and fraudulent users. In step 152, a set of mouse movement datasets is received, each mouse movement dataset of the set of mouse movement datasets including mouse movement data generated by either a legitimate user or a fraudulent user. In step 154, the set of mouse movement datasets is collected within a database stored on a storage device of the fraud detection system. In step 156, a teaching operation is performed on a risk engine of the fraud detection system using the database to train the risk engine to differentiate between mouse movement data generated by the authentic user and mouse movement data generated by the fraudulent user.

While various embodiments of the invention have been particularly shown and described, it will be understood by those skilled in the art that various changes in form and details may be made therein without departing from the spirit and scope of the invention as defined by the appended claims.

For example, in some arrangements, training apparatus 16 is directly connected to fraud detection system 14. In other arrangements, training apparatus 16 is a part of fraud detection system 14.

Furthermore, it should be understood that some embodiments are directed to training apparatus 16 which is constructed and arranged to train a fraud detection system to distinguish between legitimate users and fraudulent users. Some embodiments are directed to a process of training a fraud detection system to distinguish between legitimate users and fraudulent users. Also, some embodiments are directed to a computer program product which enables computer logic to train a fraud detection system to distinguish between legitimate users and fraudulent users.

In some arrangements, training apparatus 16 is implemented by a set of processors or other types of control/processing circuitry running software. In such arrangements, the software instructions can be delivered to training apparatus 16 in the form of a computer program product 160 (see FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of training a fraud detection system to distinguish between legitimate users and fraudulent users, the method comprising:
   receiving a set of mouse movement datasets, each mouse movement dataset of the set of mouse movement datasets including mouse movement data generated by either a legitimate user or a fraudulent user;
   collecting the set of mouse movement datasets within a database stored on a storage device of the fraud detection system;
   performing a teaching operation on a risk engine of the fraud detection system using the database to train the risk engine to differentiate between mouse movement data generated by the legitimate user and mouse movement data generated by the fraudulent user;
   wherein performing the teaching operation on the risk engine of the fraud detection system includes:
      assigning a particular distance metric of a set of distance metrics to the set of mouse movement datasets, each distance metric of the set of distance metrics defining a distance between a pair of mouse movement datasets;
      generating distances between pairs of mouse movement datasets of the set of mouse movement datasets as defined by the particular distance metric;
   wherein each mouse movement dataset of the set of mouse movement datasets includes an owner parameter having a binary value,
   wherein the mouse movement datasets having mouse movement data generated by the legitimate user form a set of legitimate datasets, each legitimate dataset of the set of legitimate datasets having a first binary value,
   wherein the mouse movement datasets having mouse movement data generated by the fraudulent user form a set of fraudulent datasets, each fraudulent dataset of the set of fraudulent datasets having a second binary value, and
   wherein performing the teaching operation on the risk engine of the fraud detection system further includes:
      for each mouse movement dataset of the set of mouse movement datasets:
         generating an average distance from the mouse movement dataset to legitimate datasets of the set of legitimate datasets; and
         forming, as a training pair of a set of training pairs, the average distance and the binary value.

2. A method according to claim 1,
   wherein mouse movement data of each mouse movement dataset includes a set of coordinate pairs sampled at a regular time interval,
   wherein each mouse movement dataset includes a dimensionality equal to the number of coordinate pairs of the mouse movement dataset, the dimensionality of the mouse movement dataset corresponding to a session length of the mouse movement dataset, and
   wherein assigning the particular distance metric of the set of distance metrics to the set of mouse movement datasets includes:
      assigning a particular representation of a set of representations to the set of mouse movement datasets, each representation of the set of representations defining, for each mouse movement dataset of the set of mouse movement datasets, a transform of the mouse movement dataset that is effective to reduce the dimensionality of the mouse movement dataset; and
      for each mouse movement dataset of the set of mouse movement datasets, generating a particular transform of the mouse movement dataset as defined by the particular representation.

3. A method according to claim 2,
   wherein a threshold session length is defined as a minimum session length of a mouse movement dataset below which the mouse movement dataset is removed from the database, and
   wherein assigning the particular distance metric of the set of distance metrics to the set of mouse movement datasets further includes:
      for each mouse movement dataset of the set of mouse movement datasets, comparing the session length of the mouse movement dataset to the threshold session length.

4. A method according to claim 2,
   wherein the mouse movement datasets having mouse movement data generated by the legitimate user form a set of legitimate datasets,
   wherein the mouse movement datasets having mouse movement data generated by the fraudulent user form a set of fraudulent datasets,
   wherein an inner-distance of a legitimate dataset of the set of legitimate datasets is defined as an average value of the distance, as defined by a distance metric of the set of distance metrics and a representation of the set of representations, between a transform of the legitimate dataset and transforms of other of legitimate datasets of the set of legitimate datasets,
   wherein an inter-distance of a legitimate dataset of the set of legitimate datasets is defined as an average value of the distance, as defined by the distance metric and a representation of the set of representations, between a transform of the legitimate dataset and transforms of fraudulent datasets of the set of fraudulent datasets, and
   wherein assigning the particular representation of the set of representations to the set of mouse movement datasets includes:
      for each representation of the set of representations and for each distance metric of the set of distance metrics:
         for each legitimate dataset of the set of legitimate datasets, generating the inner-distance of the legitimate dataset and the inter-distance of the legitimate dataset; and
         defining a distance-pass rate of the distance metric as a proportion of legitimate datasets having the inter-distance being greater than the inner-distance; and
      selecting the distance metric for which the distance-pass rate is a maximum.

5. A method according to claim 4,
   wherein assigning the particular representation of the set of representations to the set of mouse movement datasets further includes:
      for each distance metric of the set of distance metrics, defining a pass-rate as a proportion of legitimate datasets from which more than half of the fraudulent datasets are at a distance larger than the inter-distance; and
      selecting the distance metric for which product of the distance-pass rate and the pass-rate is a maximum.

6. A method according to claim 1,
   wherein performing the teaching operation on the risk engine of the fraud detection system further includes:
      for each mouse movement dataset of the set of mouse movement datasets, assigning the mouse movement dataset to a cluster according to a cluster metric of a set of cluster metrics based on the distances between the mouse movement dataset and the other mouse movement datasets of the set of mouse movement datasets, the cluster being indicative of whether the mouse movement data of the mouse movement dataset was generated by the legitimate user or the fraudulent user.

7. A method according to claim 6,
wherein, when the mouse movement datasets of the set of mouse movement datasets are assigned to one of a first cluster and a second cluster:
for each mouse movement dataset assigned to the first cluster, an inner-distance of the mouse movement dataset is defined as an average value of the distance, as defined by the distance metric, between the mouse movement dataset and other mouse movement datasets assigned to the first cluster;
for each mouse movement dataset assigned to the first cluster, an inter-distance of the mouse movement dataset is defined as an average value of the distance, as defined by the distance metric, between the mouse movement dataset and mouse movement datasets assigned to the second cluster; and
wherein assigning the mouse movement dataset to the cluster according to a cluster metric of a set of cluster metrics includes:
for each cluster metric of the set of cluster metrics:
for each mouse movement dataset of the mouse movement datasets assigned to the first cluster according to the cluster metric, generating the inner-distance of the legitimate dataset and the inter-distance of the mouse movement dataset; and
defining a distance-pass rate of the distance metric as a proportion of mouse movement datasets in the first cluster having the inter-distance being greater than the inner-distance; and
selecting the distance metric for which the distance-pass rate is a maximum.

8. A method according to claim 7,
wherein assigning the mouse movement dataset to the cluster according to a cluster metric of a set of cluster metrics further includes:
for each cluster metric of the set of cluster metrics, defining a pass-rate as a proportion of mouse movement datasets assigned to the first cluster from which more than half of the mouse movement datasets assigned to the second cluster are at a distance larger than the inter-distance; and
selecting the distance metric for which product of the distance-pass rate and the pass-rate is a maximum.

9. A method as in claim 1, wherein the set of legitimate datasets includes multiple legitimate datasets; and
wherein generating the average distance from the mouse movement dataset to the legitimate datasets of the set of legitimate datasets includes producing a mean distance between the mouse movement datasets and each of the multiple legitimate datasets.

10. A method as in claim 1, further comprising:
for each mouse movement dataset of the set of mouse movement datasets:
receiving an indication from the risk engine that that mouse movement dataset has been classified as having been originated by one of a fraudulent user and a legitimate user based on the average distance of the training pair formed for that mouse movement dataset; and
comparing the indication to the binary value of the training set formed for that mouse movement dataset.

11. An apparatus constructed and arranged to train a fraud detection system to distinguish between legitimate users and fraudulent users, the system comprising:
a network interface;
memory; and
a controller including controlling circuitry coupled to the memory, the controlling circuitry being constructed and arranged to:
receive a set of mouse movement datasets, each mouse movement dataset of the set of mouse movement datasets including mouse movement data generated by either a legitimate user or a fraudulent user;
collect the set of mouse movement datasets within a database stored on a storage device of the fraud detection system;
perform a teaching operation on a risk engine of the fraud detection system using the database to train the risk engine to differentiate between mouse movement data generated by the legitimate user and mouse movement data generated by the fraudulent user;
wherein performing the teaching operation on the risk engine of the fraud detection system includes:
assigning a particular distance metric of a set of distance metrics to the set of mouse movement datasets, each distance metric of the set of distance metrics defining a distance between a pair of mouse movement datasets;
generating distances between pairs of mouse movement datasets of the set of mouse movement datasets as defined by the particular distance metric;
wherein each mouse movement dataset of the set of mouse movement datasets includes an owner parameter having a binary value,
wherein the mouse movement datasets having mouse movement data generated by the legitimate user form a set of legitimate datasets, each legitimate dataset of the set of legitimate datasets having a first binary value,
wherein the mouse movement datasets having mouse movement data generated by the fraudulent user form a set of fraudulent datasets, each fraudulent dataset of the set of fraudulent datasets having a second binary value, and
wherein performing the teaching operation on the risk engine of the fraud detection system further includes:
for each mouse movement dataset of the set of mouse movement datasets:
generating an average distance from the mouse movement dataset to legitimate datasets of the set of legitimate datasets; and
forming, as a training pair of a set of training pairs, the average distance and the binary value.

12. An apparatus according to claim 11,
wherein mouse movement data of each mouse movement dataset includes a set of coordinate pairs sampled at a regular time interval,
wherein each mouse movement dataset includes a dimensionality equal to the number of coordinate pairs of the mouse movement dataset, the dimensionality of the mouse movement dataset corresponding to a session length of the mouse movement dataset, and
wherein assigning the particular distance metric of the set of distance metrics to the set of mouse movement datasets includes:
assigning a particular representation of a set of representations to the set of mouse movement datasets, each representation of the set of representations defining, for each mouse movement dataset of the set of mouse movement datasets, a transform of the mouse movement dataset that is effective to reduce the dimensionality of the mouse movement dataset; and for each mouse movement dataset of the set of mouse movement datasets, generating a particular transform of the mouse movement dataset as defined by the particular representation.

13. An apparatus according to claim 12,
wherein the mouse movement datasets having mouse movement data generated by the legitimate user form a set of legitimate datasets,
wherein the mouse movement datasets having mouse movement data generated by the fraudulent user form a set of fraudulent datasets,
wherein an inner-distance of a legitimate dataset of the set of legitimate datasets is defined as an average value of the distance, as defined by a distance metric of the set of distance metrics and a representation of the set of representations, between a transform of the legitimate dataset and transforms of other of legitimate datasets of the set of legitimate datasets,
wherein an inter-distance of a legitimate dataset of the set of legitimate datasets is defined as an average value of the distance, as defined by the distance metric and a representation of the set of representations, between a transform of the legitimate dataset and transforms of fraudulent datasets of the set of fraudulent datasets, and
wherein assigning the particular representation of the set of representations to the set of mouse movement datasets includes:
for each representation of the set of representations and for each distance metric of the set of distance metrics:
for each legitimate dataset of the set of legitimate datasets, generating the inner-distance of the legitimate dataset and the inter-distance of the legitimate dataset; and
defining a distance-pass rate of the distance metric as a proportion of legitimate datasets having the inter-distance being greater than the inner-distance; and
selecting the distance metric for which the distance-pass rate is a maximum.

14. An apparatus according to claim 11,
wherein performing the teaching operation on the risk engine of the fraud detection system further includes:
for each mouse movement dataset of the set of mouse movement datasets, assigning the mouse movement dataset to a cluster according to a cluster metric of a set of cluster metrics based on the distances between the mouse movement dataset and the other mouse movement datasets of the set of mouse movement datasets, the cluster being indicative of whether the mouse movement data of the mouse movement dataset was generated by the legitimate user or the fraudulent user.

15. A computer program product having a non-transitory, computer-readable storage medium which stores code to train a fraud detection system to distinguish between legitimate users and fraudulent users, the code including instructions to:
receive a set of mouse movement datasets, each mouse movement dataset of the set of mouse movement datasets including mouse movement data generated by either a legitimate user or a fraudulent user;
collect the set of mouse movement datasets within a database stored on a storage device of the fraud detection system;

perform a teaching operation on a risk engine of the fraud detection system using the database to train the risk engine to differentiate between mouse movement data generated by the legitimate user and mouse movement data generated by the fraudulent user;

wherein performing the teaching operation on the risk engine of the fraud detection system includes:
assigning a particular distance metric of a set of distance metrics to the set of mouse movement datasets, each distance metric of the set of distance metrics defining a distance between a pair of mouse movement datasets;
generating distances between pairs of mouse movement datasets of the set of mouse movement datasets as defined by the particular distance metric;

wherein each mouse movement dataset of the set of mouse movement datasets includes an owner parameter having a binary value,
wherein the mouse movement datasets having mouse movement data generated by the legitimate user form a set of legitimate datasets, each legitimate dataset of the set of legitimate datasets having a first binary value,
wherein the mouse movement datasets having mouse movement data generated by the fraudulent user form a set of fraudulent datasets, each fraudulent dataset of the set of fraudulent datasets having a second binary value, and
wherein performing the teaching operation on the risk engine of the fraud detection system further includes:
for each mouse movement dataset of the set of mouse movement datasets:
generating an average distance from the mouse movement dataset to legitimate datasets of the set of legitimate datasets; and
forming, as a training pair of a set of training pairs, the average distance and the binary value.

16. A computer program product according to claim 15,
wherein mouse movement data of each mouse movement dataset includes a set of coordinate pairs sampled at a regular time interval,
wherein each mouse movement dataset includes a dimensionality equal to the number of coordinate pairs of the mouse movement dataset, the dimensionality of the mouse movement dataset corresponding to a session length of the mouse movement dataset, and
wherein assigning the particular distance metric of the set of distance metrics to the set of mouse movement datasets includes:
assigning a particular representation of a set of representations to the set of mouse movement datasets, each representation of the set of representations defining, for each mouse movement dataset of the set of mouse movement datasets, a transform of the mouse movement dataset that is effective to reduce the dimensionality of the mouse movement dataset; and
for each mouse movement dataset of the set of mouse movement datasets, generating a particular transform of the mouse movement dataset as defined by the particular representation.

17. A computer program product according to claim 16,
wherein the mouse movement datasets having mouse movement data generated by the legitimate user form a set of legitimate datasets,
wherein the mouse movement datasets having mouse movement data generated by the fraudulent user form a set of fraudulent datasets, wherein an inner-distance of a legitimate dataset of the set of legitimate datasets is defined as an average value of the distance, as defined by a distance metric of the set of distance metrics and a representation of the set of representations, between a transform of the legitimate dataset and transforms of other of legitimate datasets of the set of legitimate datasets, wherein an inter-distance of a legitimate dataset of the set of legitimate datasets is defined as an average value of the distance, as defined by the distance metric and a representation of the set of representations, between a transform of the legitimate dataset and transforms of fraudulent datasets of the set of fraudulent datasets, and wherein assigning the particular representation of the set of representations to the set of mouse movement datasets includes:

for each representation of the set of representations and for each distance metric of the set of distance metrics:

for each legitimate dataset of the set of legitimate datasets, generating the inner-distance of the legitimate dataset and the inter-distance of the legitimate dataset; and         defining a distance-pass rate of the distance metric as a proportion of legitimate datasets having the inter-distance being greater than the inner-distance; and     selecting the distance metric for which the distance-pass rate is a maximum.

18. A computer program product according to claim 15, wherein performing the teaching operation on the risk engine of the fraud detection system further includes:

for each mouse movement dataset of the set of mouse movement datasets, assigning the mouse movement dataset to a cluster according to a cluster metric of a set of cluster metrics based on the distances between the mouse movement dataset and the other mouse movement datasets of the set of mouse movement datasets, the cluster being indicative of whether the mouse movement data of the mouse movement dataset was generated by the legitimate user or the fraudulent user.

* * * * *